United States Patent
Siebenschuh et al.

(10) Patent No.: US 11,874,415 B2
(45) Date of Patent: Jan. 16, 2024

(54) EARTHQUAKE DETECTION AND RESPONSE VIA DISTRIBUTED VISUAL INPUT

(71) Applicant: INTERNATIONAL BUSINESS MACHINES CORPORATION, Armonk, NY (US)

(72) Inventors: Carlo Siebenschuh, White Plains, NY (US); Conrad M. Albrecht, White Plains, NY (US); Johannes Walter Schmude, Dobbs Ferry, NY (US); Hendrik F. Hamann, Yorktown Heights, NY (US); Siyuan Lu, Yorktown Heights, NY (US); Oki Gunawan, Westwood, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 17/131,452

(22) Filed: Dec. 22, 2020

(65) Prior Publication Data

US 2022/0196860 A1   Jun. 23, 2022

(51) Int. Cl.
*G01V 1/00* (2006.01)
*G06T 7/246* (2017.01)
(Continued)

(52) U.S. Cl.
CPC ............ *G01V 1/008* (2013.01); *G06N 3/04* (2013.01); *G06N 3/08* (2013.01); *G06T 7/246* (2017.01); *G06T 2207/30181* (2013.01)

(58) Field of Classification Search
CPC .............. G01V 1/008; G06T 7/246; G06T 2207/30181; G06N 3/04; G06N 3/08
See application file for complete search history.

(56) References Cited

U.S. PATENT DOCUMENTS

2009/0128628 A1* 5/2009 Reinitz .............. H04N 21/4728
  706/47
2011/0019096 A1* 1/2011 Lee ....................... G06T 7/0002
  348/E5.062
(Continued)

FOREIGN PATENT DOCUMENTS

CN 103676917 A 10/2016
CN 106254826 A 12/2016
(Continued)

OTHER PUBLICATIONS

KR-20080105944A , 2008, Espacenet English Translation, downloaded from the Internet on Oct. 22, 2022 (Year: 2008).*
(Continued)

*Primary Examiner* — Arleen M Vazquez
*Assistant Examiner* — Lyudmila Zaykova-Feldman
(74) *Attorney, Agent, or Firm* — Intelletek Law Group, PLLC; Gabriel Daniel, Esq.

(57) ABSTRACT

From each of a plurality of cameras, a visual input of a location is received over a network. For each visual input from the plurality of cameras, a coupling correction is performed between a shaking of the camera with respect to the visual input by subtracting velocity vectors of the plurality of cameras from velocity vectors of pixels defining the visual input to provide a processed input. It is determined whether a shaking identified in the processed input is above a predetermined threshold based on the processed input, thereby detecting one or more anomalies. From the one or more anomalies, at least one of a location, magnitude, or depth of an earthquake are inferred based on the shaking identified in the processed input of each of the plurality of cameras.

20 Claims, 13 Drawing Sheets

(51) Int. Cl.
   *G06N 3/04*       (2023.01)
   *G06N 3/08*       (2023.01)

(56) References Cited

U.S. PATENT DOCUMENTS

| | | | |
|---|---|---|---|
| 2011/0292220 A1* | 12/2011 | Georgis | G01V 1/008 |
| | | | 348/207.1 |
| 2013/0321589 A1* | 12/2013 | Kirk | G06T 17/00 |
| | | | 348/47 |
| 2015/0318015 A1 | 11/2015 | Bose et al. | |
| 2016/0173963 A1 | 6/2016 | Filson et al. | |
| 2017/0075009 A1* | 3/2017 | Khalil | G01V 1/364 |
| 2017/0134658 A1 | 5/2017 | Miyahara | |
| 2017/0155845 A1 | 6/2017 | Manabe | |
| 2021/0174492 A1* | 6/2021 | Karaaslan | G06V 10/774 |
| 2021/0247531 A1 | 8/2021 | Kim et al. | |

FOREIGN PATENT DOCUMENTS

| | | | |
|---|---|---|---|
| EP | 2169945 A2 | | 3/2010 |
| JP | 2005037273 A | | 5/2009 |
| KR | 20080105944 A | * | 12/2008 |
| KR | 20180136671 A | * | 12/2018 |
| KR | 20180136671 A | | 12/2018 |
| WO | 2020096099 A1 | | 5/2020 |
| WO | WO-2021224893 A1 | * | 11/2021 |

OTHER PUBLICATIONS

KR20180136671A, 2018, Espacenet English Translation, downloaded from the Internet on Oct. 16, 2022 (Year: 2018).*

KR-20080105944A, 2008, Espacenet English Translation, downloaded from the Internet on Oct. 22, 2022 (Year:2008) (Year: 2008).*

KR-20180136671A, 2018, Espacenet English Translation, downloaded from the Internet on Oct. 16, 2022 (Year:2018) (Year: 2018).*

Mell, P. et al., "Recommendations of the National Institute of Standards and Technology"; NIST Special Publication 800-145 (2011); 7 pgs.

Anonymous, A Earthquake Early-Warning System IPCOM000256226D; Nov. 14, 2018, 13 pgs.

Earle, P. S. et al., "Twitter Earthquake Detection: Earthquake Monitoring in a Social World"; Annals of Geophysics (2011); vol. 54:6; 8 pgs.

Xia, R. et al., "Scientists Develop New App that uses your Cellphone to Detect Earthquakes"; www.latimes.com (2016); 17 pgs., downloaded Dec. 22, 2020.

Combined Search and Examination Report dated May 6, 2022 in related GB Application No. 2117422.2; 7 pgs.

* cited by examiner

EARTHQUAKE DETECTION AND RESPONSE VIA DISTRIBUTED VISUAL INPUT

TECHNICAL FIELD

The present disclosure generally relates to earthquake detection systems and methods, and more particularly, to systems and methods of measuring earthquake magnitudes and intensities.

DESCRIPTION OF THE RELATED ART

Earthquakes (EQs) strike around the globe causing fatalities in the thousands and costing billions in damage, (e.g. Indonesia (2004): 227k, 8.71bn or Japan (2011): 15k, 360bn). An EQ is characterized by location (epicenter), depth as well as its severity expressed by magnitude (by Richter scale) and intensity (e.g. by Modified Mercalli scale). Magnitude is released seismic energy and is recorded through a dense network of cost-intensive seismographs. Intensity is the observed effect on the Earth's surface ranging from perceived shaking to building's structural damage. Intensity is the true characteristic of interest for disaster response as magnitude does not relate to the EQ effects. Intensity measures are based on an arbitrary ranking and assessed through questionnaires sent-out long after the EQ. A real-time intensity measure enables early warning messages, and determines evacuation and rescue missions. Accurate forecasting of an earthquake is considered by experts as practically impossible with current methods and technology. For magnitude, earthquake warning systems (EWS) provide timely detection to send out warnings within seconds.

SUMMARY

According to various embodiments, a non-transitory computer readable storage medium, a computer-implemented method and a computer program product are provided which, during an earthquake, recognize abnormal shaking over multiple cameras that interface with the cloud. From each of a plurality of cameras, a visual input of a location is received over a network. For each visual input from the plurality of cameras, a coupling correction is performed between a shaking of the camera with respect to the visual input by subtracting velocity vectors of the plurality of cameras from velocity vectors of pixels defining the visual input to provide a processed input. It is determined whether a shaking identified in the processed input is above a predetermined threshold based on the processed input, thereby detecting one or more anomalies. From the one or more anomalies, at least one of a location, magnitude, or depth of an earthquake are inferred based on the shaking identified in the processed input of each of the plurality of cameras.

In one embodiment, an intensity of the earthquake is determined based on the shaking identified in the processed input of each of the plurality of cameras.

In one embodiment, the inference of the at least one of the location, magnitude, or depth includes extracting and aggregating local approximations of at least one of a phase delay between a predetermined maximum pixel value applied to each pixel location in the visual input and an amplitude of a maximum value of a pixel location across an entirety of the visual input In one embodiment, the shaking is measured by one or more pixel-wise changes of the processed input.

In one embodiment, for at least one visual input from the plurality of cameras a spectral analysis over time of each of the pixel-wise changes in at least one image of the visual input is performed. A spectral decomposition of the at least one image of the visual input is determined.

In one embodiment, an artificial intelligence (AI) model is trained to detect parameters of an earthquake based on the visual input from the plurality of cameras. The trained AI model is applied to visual input from a different set of a plurality of cameras at a separate location.

In one embodiment, after a completion of an identified earthquake, indicators of at least one of a magnitude, a location, or a depth of the identified earthquake are stored in a predetermined memory.

In one embodiment, a calibration of the plurality of cameras is refined via external seismic sensor data.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
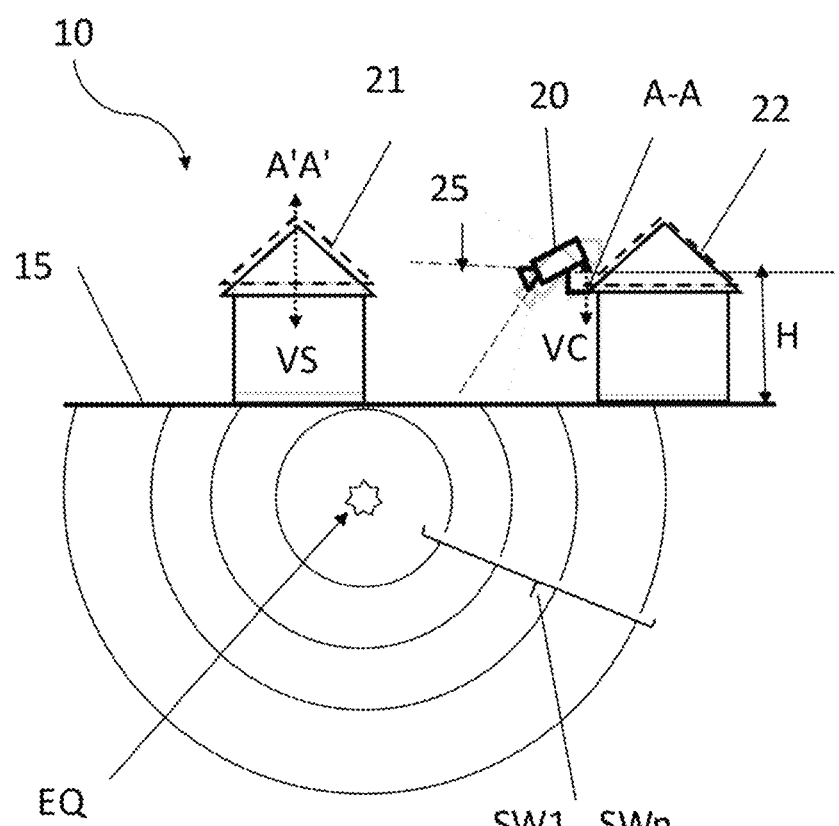
FIG. 1 illustrates a location of an earthquake emitting seismic waves towards a ground surface and causing shaking of structures, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Prior to an earthquake, a plurality of Internet Protocol (IP) cameras located across a particular area or location for surveillance or meteorological observation provide video streams and coordinates communicated online via the internet or to a dedicated network. Footage from these cameras is generally provided to the public at no charge. The teachings herein harvest information from such cameras and provide meaningful insight to a seismic activity at one or more locations.

In one aspect, during an earthquake, abnormal shaking of a captured scene is recognized across a plurality of Internet Protocol (IP) cameras that provide distributed visual input of a location, via interfacing with a cloud or dedicated network, thereby defining at least a portion of a system for earthquake detection.

The various embodiments include steps to perform, or instructions for executing or implementing, measuring shaking of a location by pixel-wise changes of at least one image appearing on at least one of the plurality of cameras. Coupling of the pixel-wise changes of natural objects or artificial objects or natural and artificial objects is corrected in the at least one image from pixel-wise changes induced by shaking of the at least one of the plurality of cameras. At least one of magnitude, location, or depth of the earthquake can be inferred. An assessment of intensity of the earthquake can then be provided.

In one embodiment, spectral analysis over time of the pixel-wise changes in the at least one image to yield spectral decomposition is performed. The spectral analysis may be decoupled over time of the pixel-wise changes by phase delay, frequency shift, and amplitude into a first group representing a scene in the at least one image and into a second group representing the at least one of the plurality of cameras. It is noted that in the present disclosure, an observer also represents a camera.

In one embodiment local approximations of phase delay, frequency shift, and amplitude are extracted and aggregated to infer at least one of magnitude or intensity of the earthquake. Local approximations of phase delay, frequency shift and amplitude are considered to be the local impact of an earthquake as generated at the position of a camera as computed by a server centrally positioned amongst a group or plurality of cameras. A location and depth of the earthquake can be inferred.

Inferring the characteristics of an EQ (Y) from the input of various cameras (X) is a supervised regression problem with an unobservable function f while X and Y are observed. However, since the IP cameras are similar, the model on the central server is re-calibrated. The central server has a model (f_estimate), which ideally relates the visual input to an EQ event, i.e., f_estimate(X)=Y_estimate.

After an EQ has occurred (X and Y are available), Y stemming from a seismic network as is, almost perfectly infers EQ location etc., (summarized in Y) the model error of (Y_estimate−Y) can be assessed. The server (e.g., the earthquake analytics engine running on the server) can re-calibrate the model to f_estimate_new such that f_estimate_new(X) equals Y more closely.

After an earthquake, indicators of at least one of magnitude, location, or depth of the earthquake, as well as an assessment of earthquake intensity can be stored in an appropriate memory. Further, system calibration can be refined. For example, the central server can refine the learned EQ inference model via external seismic sensor data and additional assessment of earthquake intensity. In addition, more IP cameras can be deployed in positions where IP cameras are sparsely populating the area such that the existing model lacks input from the pre-existing network of IP cameras.

After each EQ (and some non-EQ "events"), the record of training data is appended and the pre-existing AI is re-trained according to the newly available data. This changes the parameter values of the AI ('re-calibrates' them). However, the model architecture, it's input, and code remain the same. Moreover, it can be automated to take place periodically.

As noted above, prior to an earthquake, the plurality of IP cameras is located across a particular area or location for surveillance or meteorological observation. Video streams and coordinates are communicated online via the internet or to a dedicated network. The various embodiments of the disclosure are facilitated with video streams from the plurality of IP cameras.

By virtue of the concepts discussed herein, utilization is made of seismographic and intensity indicators that already exist prior to an occurrence of an earthquake. During an earthquake the images provided by the IP cameras can be de-coupled and a computer vision algorithm is generated. A signal from the dedicated seismic sensory network is processed by an Artificial Intelligence (AI) network that translates and improves the heuristics of the Mercalli scale of earthquake intensity measurement.

The AI model can be trained or extended to a new closed-circuit television (CCTV) so as to transfer detection capability from a pre-existing CCTV to the new CCTV. In one embodiment, a single camera turning black may not provide sufficient information regarding earthquake detection, as it could be malfunctioning, being uninstalled etc. However, a plurality of cameras turning black (e.g., in a city), while other cameras around the location are picking up on an EQ event, can indicate that an EQ took place, which may be causing an electricity outage in the city (thereby turning many of the cameras off). In one embodiment, even a signal loss (if it is closely correlated in time and space, and other functioning cameras pick up a shaking) indicates an EQ.

The shaking of the camera, just like any object in its view, may slightly deviate from the overall frequency of the Earthquake. An algorithm identifies the abnormal shaking and the magnitude of the shaking via a Deep Learning system. In one embodiment, triangulation between cameras is used to identify an amount of shaking. The triangulation is implicitly learned by the AI system. The AI system is able to relate inputs from different geographical locations in one system.

For example, consider a sequence of IP camera images being mapped to an embedding vector through AI (e.g., by a deep neural network (DNN)). This embedding vector, which may include a few hundred floating point numbers, is a nonlinear, low-dimensional, storage representation of what is going on in the video. These embedding vectors (plus latitude/longitude) are merged together as a joint (subsequent) input into the actual EQ detection.

However, since such AI systems are learned "end-to-end," the embedding learning and the actual EQ detection are merged jointly in one AI system. Therefore, in one embodiment, there is no explicit triangulation algorithm used. The system learns on its own from the embedding vectors and latitude and longitude. The model will automatically relate the IP camera input from the same vicinity when inferring an EQ event in that approximate location Seismic networks provide the ground truth of EQ characteristics (magnitude etc.) as referred to by Y. As an example, assume a video footage having a time duration of 1 minute during an earthquake. Location is inferred at time t=30 seconds, vector value Y+/−10 seconds that string value, magnitude, location via spectral decomposition. A second video is superimposed to determine X tilde (X~). It is noted that X is the endogenous model input, i.e. the video input X is the original video input. The X~ is a derived input, by computing the spectral decomposition along video images. Therefore, it is just the addition of features allowing the AI to more accurately and faster identify an EQ. Accordingly, as used herein, the variable X is understood as the entire input: raw plus derived features, i.e. X:=(X, X~).

Inferring the characteristics of an EQ (Y) from the input of various cameras (X) is a supervised regression problem with an unobservable function f while X and Y are observed. However, since the IP cameras are the same, the model on the central server is re-calibrated. The central server has a model (f_estimate) which ideally relates the visual input to an EQ event, i.e. f_estimate(X)=Y_estimate. After an EQ has occurred (X and Y are available), Y stemming from a seismic network as is almost perfectly infers EQ location etc. (summarized in Y) one can assess the model error of (Y_estimate−Y). Then, the server can re-calibrate the model to f_estimate_new such that f_estimate_new (X) equals Y more closely. The shaking in the image of one camera can simply be a noisy estimator of the strength/location of an EQ.

While seismic sensors are well-calibrated, they are expensive, sparsely located and require additional knowledge (e.g., about the geological properties of the surroundings). In this regard, IP cameras are not only a noisy estimator of seismic activities but a highly local one as now knowledge outside of the view frame is provided. In addition, IP cameras are vastly more ubiquitous. The more cameras that are leveraged, the more input is available to an AI which automatically learns to infer EQ characteristics from the distributed visual input.

As used herein, spectral composition refers to simplistic spectrally motivated, fixed transformations applied to the camera images to augment the input signal. There is no explicit physical formulation embedded. In one embodiment, the AI model does not perform physical manipulations such as a seismic inversion.

In one embodiment, the AI model treats the EQ detection as an end-to-end regression problem with (e.g., augmented) video input (X) and EQ characteristics (Y). Couple correction/anomaly detection as defined herein refers to the inner workings of modern AI, not explicitly defined/modular components of the AI, where "X" is the endogenous model input, i.e. the video input, and "Y" is the exogenous output (given as ground truth), i.e. the characteristics of the Earthquake (latitude, longitude, depth, magnitude, and intensity). In short, in one embodiment, Y is a 5-dimensional vector.

In one embodiment, Y is estimated by a seismic sensor network, which can take minutes. When the EQ starts, Y is not available as the seismic sensors are still in the process of seismic inversion to obtain Y. However, the AI earthquake analytics engine can compute a guess from the video input, what that Y (characteristics of the EQ) might be and provide a warning if a predetermined (magnitude) threshold is deemed to be exceeded.

In one embodiment, the earthquake analytics engine applies Deep Learning via a convolutional neural network to filter out shaking enabling Y to calibrate itself. The camera has one specific shaking pattern. While a convolutional neural network is used by way of example, the teachings herein are not restricted thereto.

Self-calibration merely refers to a model retraining step as the ground truth Y of the EQ is used hours/days later and compared to Y_estimate from the EQ model, i.e., it refers to applying stochastic gradient descent (SGD) on the data with one new observation, namely, X and Y of the last observed EQ.

FIG. 1 illustrates a location 10 of an earthquake EQ emitting seismic waves SW1 . . . SWn towards a ground surface 15 on which are located a first structure 21 and a second structure 22.

An IP camera 30 is mounted on second structure 22 at a height H above the ground surface 20. During the earthquake (EQ), the IP camera 20 oscillates vertically in the direction of double arrow A-A while the first structure 21 oscillates vertically in the direction of double arrow A'-A', thereby creating a distorted image captured by IP camera 20.

As a very simplified illustration of application of coupling correction and the earthquake analytics engine, the distorted image transmitted by IP camera 20 is subjected to coupling correction via the algorithm applied by the earthquake analytics engine, discussed in more detail later. The IP camera 20 has a field of view 25 that includes the first structure 21. During the earthquake EQ, the first structure 21 has a velocity vector VS in the direction of arrow A'-A' while the IP camera 20 has a velocity vector VC in the direction of arrow A-A. Therefore, the coupling correction is applied by subtracting the camera velocity vector VC from the structure velocity vector VS where a reference plane such as ground surface 15 at location 10 is established. Each pixel in the image captured by the IP camera 20 typically will have its own distinct velocity vector due to differences in the forces exerted by the earthquake EQ. Differences in angular velocity and horizontal and oblique oscillations will also affect the image and the coupling correction requirements. Such considerations can be addressed by the Deep Learning and the convolutional neural network or alternative techniques with additional application of spectral decomposition. Spectral decomposition is a technique known in the art of seismic analysis particularly for oil field drilling. Accordingly, as those skilled in the art will understand the processing in light of the disclosure, the process is not graphically illustrated herein in greater detail in the figures.

Figure 2:
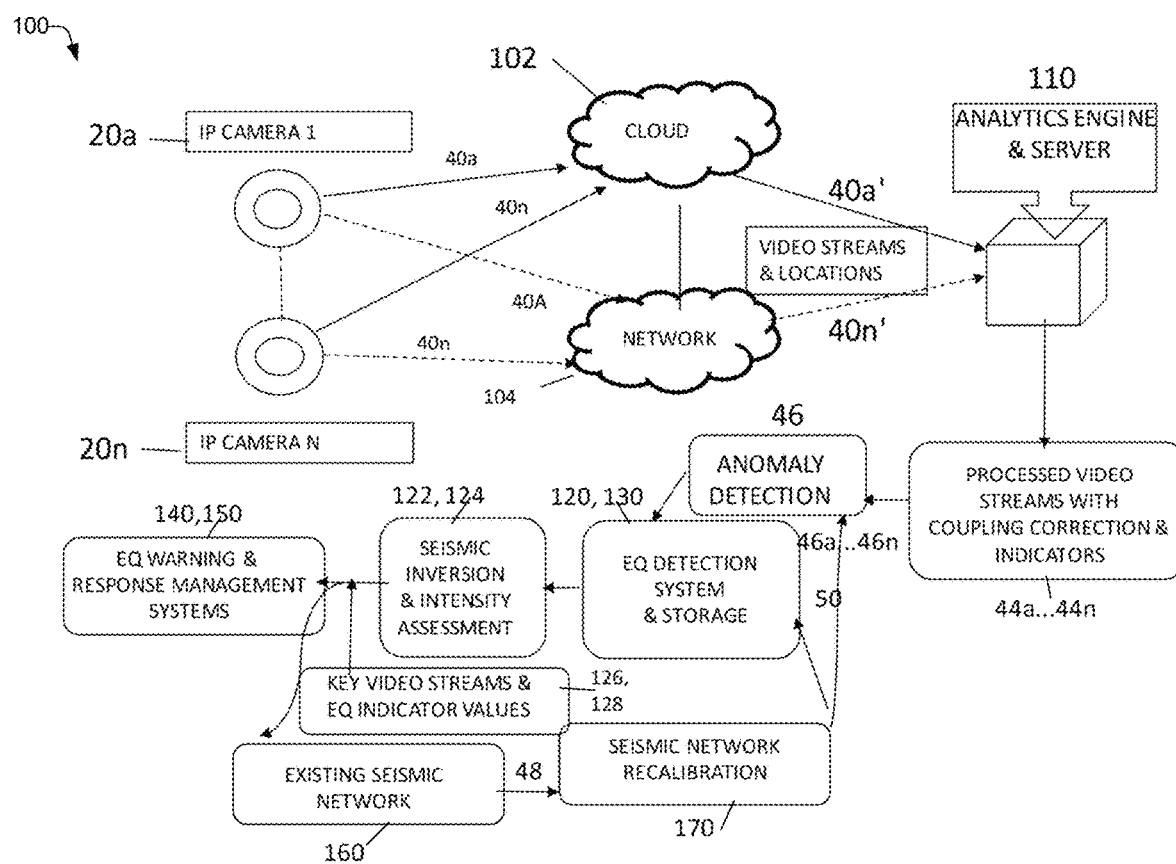
FIG. 2 is a simplified process flow diagram for an earthquake detection and response system via distributed visual input, consistent with an illustrative embodiment.

FIG. 2 is a simplified process flow diagram for an earthquake detection and response system 100 via distributed visual input according to embodiments of the disclosure.

Figure 3:
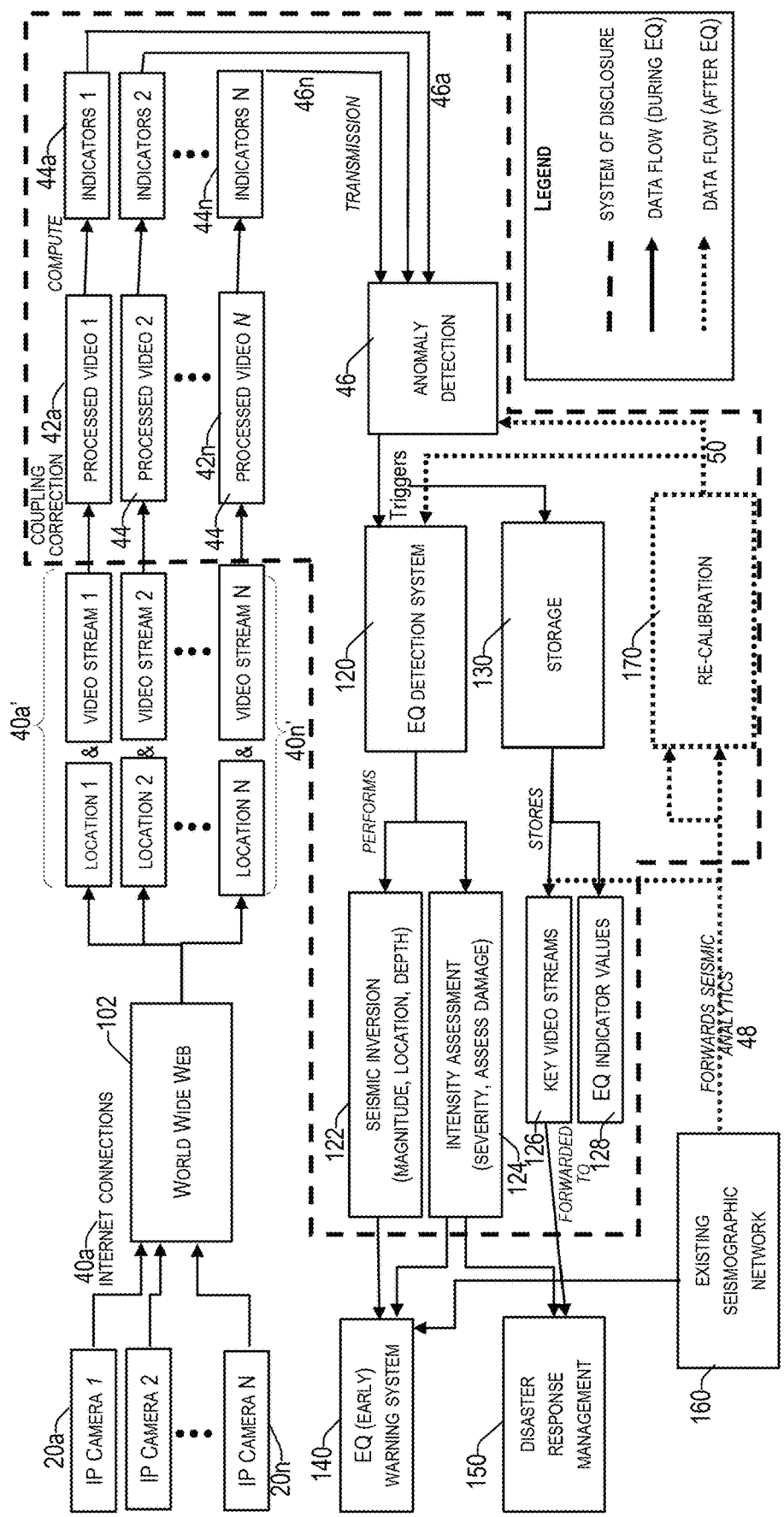
FIG. 3 is a detailed version of the process flow diagram of FIG. 2 for an earthquake detection and response system via distributed visual input, consistent with an illustrative embodiment.

FIG. 3 is a process flow diagram of an earthquake detection and response system via distributed visual input, consistent with an illustrative embodiment. A plurality of IP cameras 20a . . . 20n are pre-positioned at a location that is intended to be monitored for the occurrence of earthquakes prior to an earthquake and prior to installation of the embodiments of the disclosure. However, the plurality of IP cameras 20a . . . 20n may be positioned concurrently with, or subsequent to, installation of earthquake analytics engine/server 110 (see FIG. 2) dedicated to viewing a location that is intended to be monitored for the occurrence of earthquakes. In fact, this timing of positioning of the earthquake analytics engine/server 110 with respect to interconnections to external software and hardware applies to various functions, such as earthquake warning system, disaster response management, and the seismic network illustrated in FIG. 2 and FIG. 3. Earthquake analytics engine/server 110 is referred to herein as earthquake analytics engine 110.

The plurality of IP cameras 20a . . . 20n are in communication with the internet, the cloud 102, and additionally or alternatively, a dedicated network 104. The IP cameras 20a . . . 20n transmit image data 40a . . . 40n to the internet cloud 102 or to the dedicated network 104. The internet cloud 102 or the dedicated network 104 transmits the corresponding locations and video streams 40a' . . . 40n' to earthquake analytics engine 110. In various embodiments, the earthquake analytics engine 110 may be a software package that runs on a dedicated server and/or the cloud. The earthquake analytics engine 110 performs coupling correction 44 of the locations and video streams 40a' . . . 40n' to generate processed video streams 42a . . . 42n for the corresponding locations and converts the processed video streams for the corresponding locations 42a . . . 42n into corresponding numerical indicators or metrics 44a . . . 44n for the video streams of each corresponding camera and location.

The coupling correction 44 refers to the ability of Artificial Intelligence (AI) algorithms (most prominently but not exclusively to convolutional neural networks) to filter out various types of image perturbations (for example: shaking, changed perspective etc.) for image recognition tasks (for example object recognition, segmentation etc.). In the supervised learning problem of inferring earthquake characteristics from distributed visual input, for example, convolutions adapt during the model training process to effectively filter out such disturbances learning a lower dimensional embedding vector which is approximately invariant to image disturbances such as camera shaking. Since Internet Protocol (IP) cameras are attached (usually firmly) outside or inside a building, the amplitude of their shaking is fairly constant across time during an earthquake event while (non-attached) objects in the image of various weight, robustness, sturdiness shake to varying degrees, various AI algorithms find it easy to automatically decouple the shaking of the camera itself from the earthquake's impact on the objects in the image. It should be noted, however, that this coupling correction is not exact, i.e., not every object's movement in the image is perfectly trackable. However, this is not the objective or function of this system anyway as it takes in N camera inputs to merely infer several major earthquake characteristics. For this task, the (approximate) coupling correction suffices to reliably infer the earthquake event from distributed visual input.

As indicated above with respect to FIG. 1, the coupling correction 44 is applied to correct for coupling of the plurality of cameras 20, 20a . . . 20n and the scene being imaged by the plurality of cameras for more accurate assessment of seismic energy. Coupling correction 44 is applied by subtracting velocity vectors VC of the camera from velocity vectors of the pixels defining the visual input. Applications such as convolutional neural networking and spectral decomposition are applied to perform the coupling correction. Spectral decomposition involves spectral analysis on the change in pixels over time for a given video stream. Decoupling of spectrums of pixels is performed by phase delay, frequency shift and amplitude into two separate groups: the scene being imaged by the observer, i.e., the camera, and the camera itself.

Each reference to spectral herein simply refers to a set proposed fixed transformation of an input video (image) to augment the visual input for the AI which is subsequently ingested with it and thus represents pixel-wise changes as applied herein in the disclosure.

The processed video streams 42a . . . 42n and metrics 44a . . . 44n are then subjected to anomaly detection 46 by the earthquake analytics engine 110. If one or more anomalies are detected, the earthquake analytics engine 110 performs the functions of earthquake detection 120 and data storage 130, and the earthquake analytics engine 110 internally enters into an earthquake occurrence mode of operation. The earthquake detection system 120 via the earthquake analytics engine 110 then performs seismic inversion 122 for magnitude, location and depth, and intensity measurement 124 to assess severity of the earthquake EQ and the intensity of the damage caused by the earthquake EQ.

It is important to recognize that the earthquake detection and response system 100 as described herein includes features that are effectively sub-systems whose functions are executed by the earthquake analytics engine 110. For this reason, as an example, earthquake detection system 120 is referred to as a system but in reality, may be considered to be a sub-system with respect to the overall earthquake detection and response system 100. Other functions such as, for example, seismic inversion 122 and intensity measurement 124 may also be considered sub-systems of the earthquake detection and response system 100, Both the seismic inversion 122 and intensity measurement 124 analysis results are forwarded to earthquake early warning or response system 140, response management system 150 and to an existing seismographic network 160. The video streams 126 and earthquake indicator values 128 are also forwarded from data storage 130 to the earthquake early warning or response system 140, response management system 150 and to existing seismographic network 160.

Following the earthquake, the existing seismographic network 160 forwards seismographic analytics 48 to the earthquake analytics engine 110 for re-calibration processing 170, which in turn forwards the re-calibrated analytics 50 to earthquake detection system 120 and to anomaly detection 46 to correct for pending aftershocks and future earthquake occurrences.

Example Architecture

Figure 4:
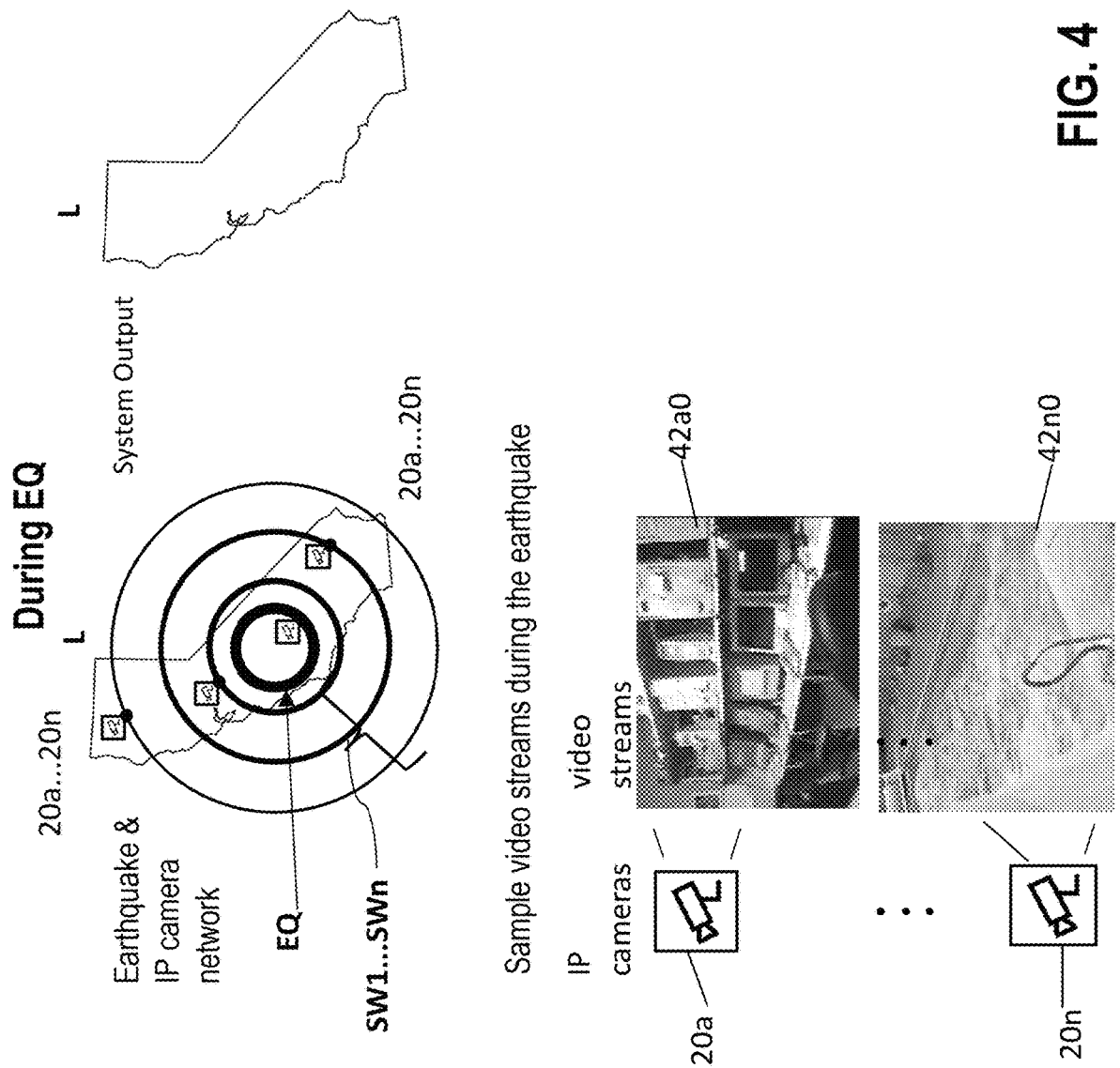
FIG. 4 is a block diagram for the conditions prior to an earthquake and a graphical illustrative feature diagram of the earthquake detection and response system via distributed visual input, consistent with an illustrative embodiment.

FIGS. 4-10 are combination method block diagrams for the conditions prior to, during, and after an earthquake of the earthquake detection and response system 100 via distributed visual input, consistent with illustrative embodiments. More particularly, FIG. 4 is a combination method block diagram for the conditions prior to an earthquake before actuation of the earthquake detection and response system 100 via distributed visual input according to embodiments of the disclosure. wherein, prior to an earthquake EQ, the plurality of IP cameras 20a . . . 20n is located across a particular area or location L for surveillance or meteorological observation and transmit image data 40a . . . 40n to the internet cloud 102 or to the dedicated network 104. Video streams and coordinates of camera locations 42a . . . 42n are communicated online via the internet 102 or through dedicated network 104, generally at no direct charge to the public. The various embodiments of the disclosure are facilitated by the video streams of locations 42a . . . 42n from the plurality of IP cameras 20a . . . 20n. The locations of the various pre-existing cameras approximate a possible span of the earthquake detection system 100 via distributed visual input. For practical purposes, an earthquake EQ can be inferred when its location occurs within such a network of IP cameras (not far outside of the network of IP cameras 20a . . . 20n). The more densely an area is populated with IP cameras, the more reliable the inferred characteristics for an earthquake event will be. Regardless, there is no required threshold for the number of cameras or the camera density in an area to facilitate a useful earthquake detection via distributed input. Therefore, the pre-trained EQ detection system (from one area on the globe) can be used to infer an earthquake event from a single IP camera on the other side of the world—although this is far from ideal as the earthquake characteristics will only be crudely estimated.

Figure 5:
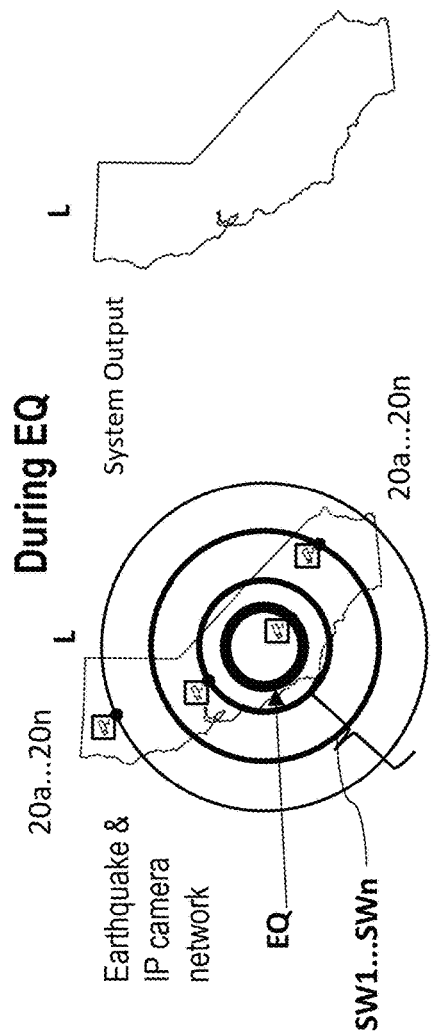
FIG. 5 is a conceptual block diagram of monitoring a location and during an earthquake recognizing abnormal shaking, consistent with an illustrative embodiment.
Figure 5:
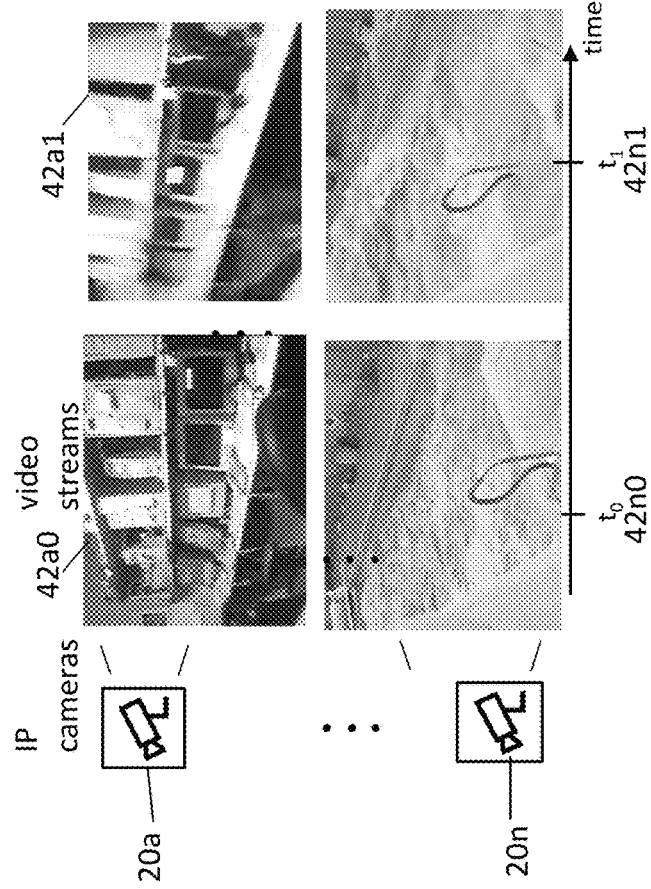

Moreover, there is no fixed spatial resolution involved. A system of IP cameras can span a city, a state/province, an entire nation or the globe. FIG. 4 and FIG. 5 constitute a subset for IP cameras for which an earthquake event EQ has been detected by the earthquake detection system 120. The images shown display a damaged area in the same vicinity (although the input from every IP \ in taken into account by the EQ detection system 120).

In a similar manner as with respect to FIG. 4, FIG. 5 illustrates an occurrence of an earthquake EQ, wherein the earthquake analytics engine 110 recognizes abnormal shaking of across the plurality of cameras 20a . . . 20n that provide distributed visual input of location L. Video streams 42a0 . . . 42n0 represent the visual input at location L at time t0 while video streams 42a1 . . . 42n1 represent the visual input at location L at time t1.

Figure 6:
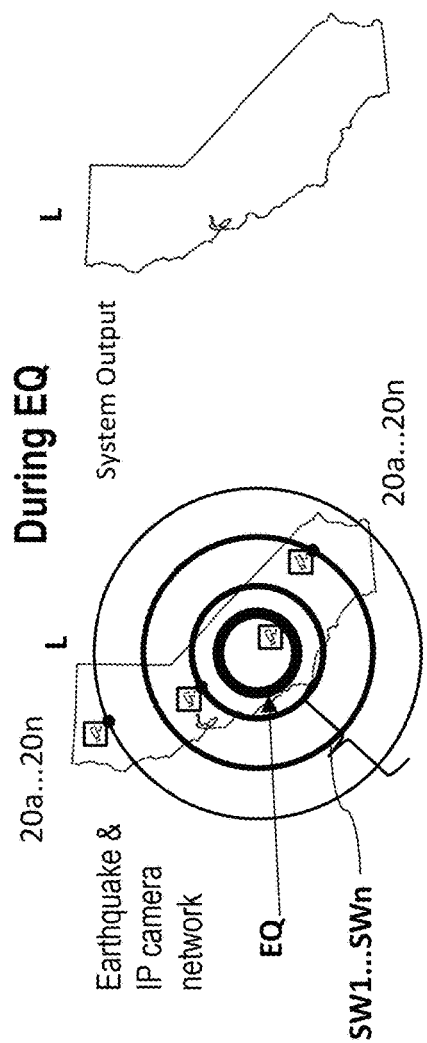
FIG. 6 is a conceptual block diagram of a correction of pixel wise changes in an image during an occurrence of an earthquake, consistent with an illustrative embodiment.
Figure 6:
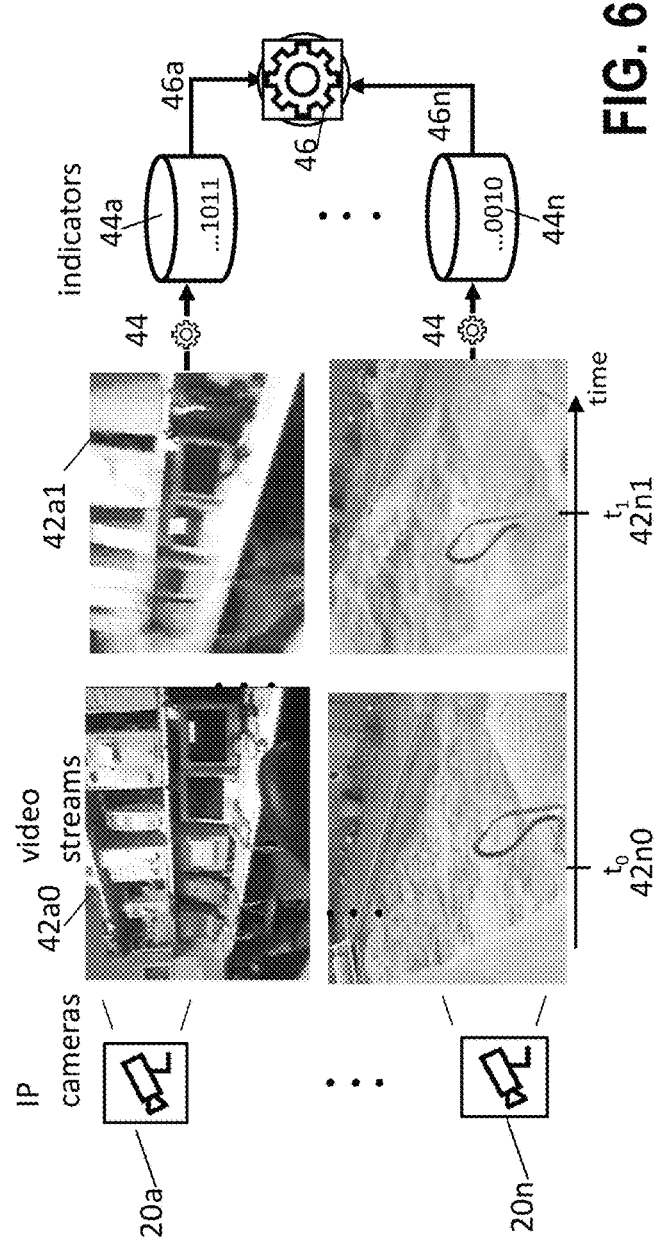

FIG. 6 is a conceptual block diagram of a correction of pixel wise changes in an image during an occurrence of an earthquake, consistent with an illustrative embodiment. For example, during the occurrence of earthquake EQ, the earthquake analytics engine 110 corrects coupling (designation 44), of the pixel-wise changes of natural objects or artificial objects or both natural and artificial objects in the at least one image 42a1 . . . 42n1 from pixel-wise changes induced by shaking of the at least one of the plurality of cameras 20a . . . 20n to yield indicators 44a . . . 44n that are transmitted as images 46a . . . 46n to anomaly detection 46.

Figure 7:
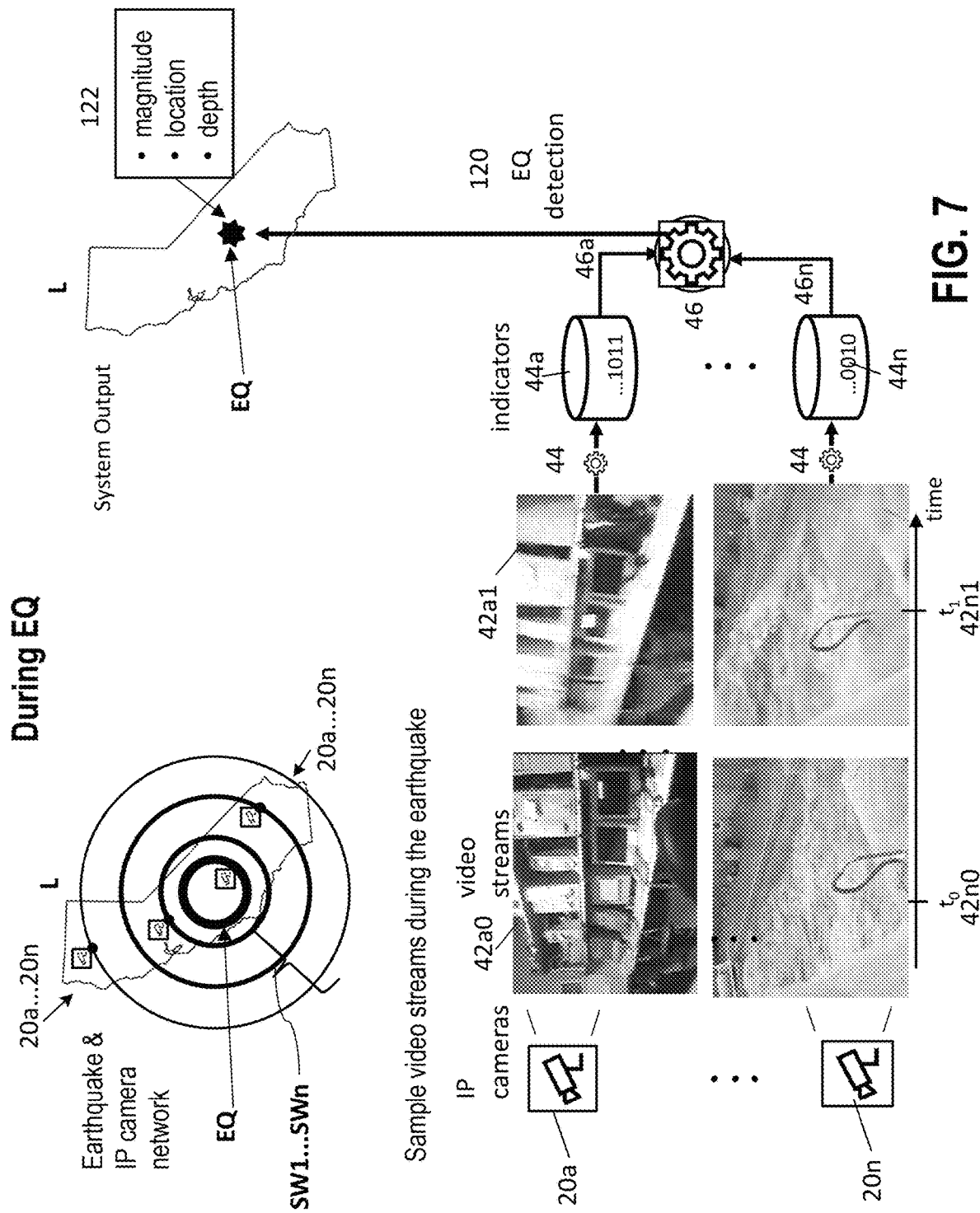
FIG. 7 is a conceptual block diagram of an inference of a magnitude, location, and depth of an earthquake via seismic inversion, consistent with an illustrative embodiment.
Figure 8:
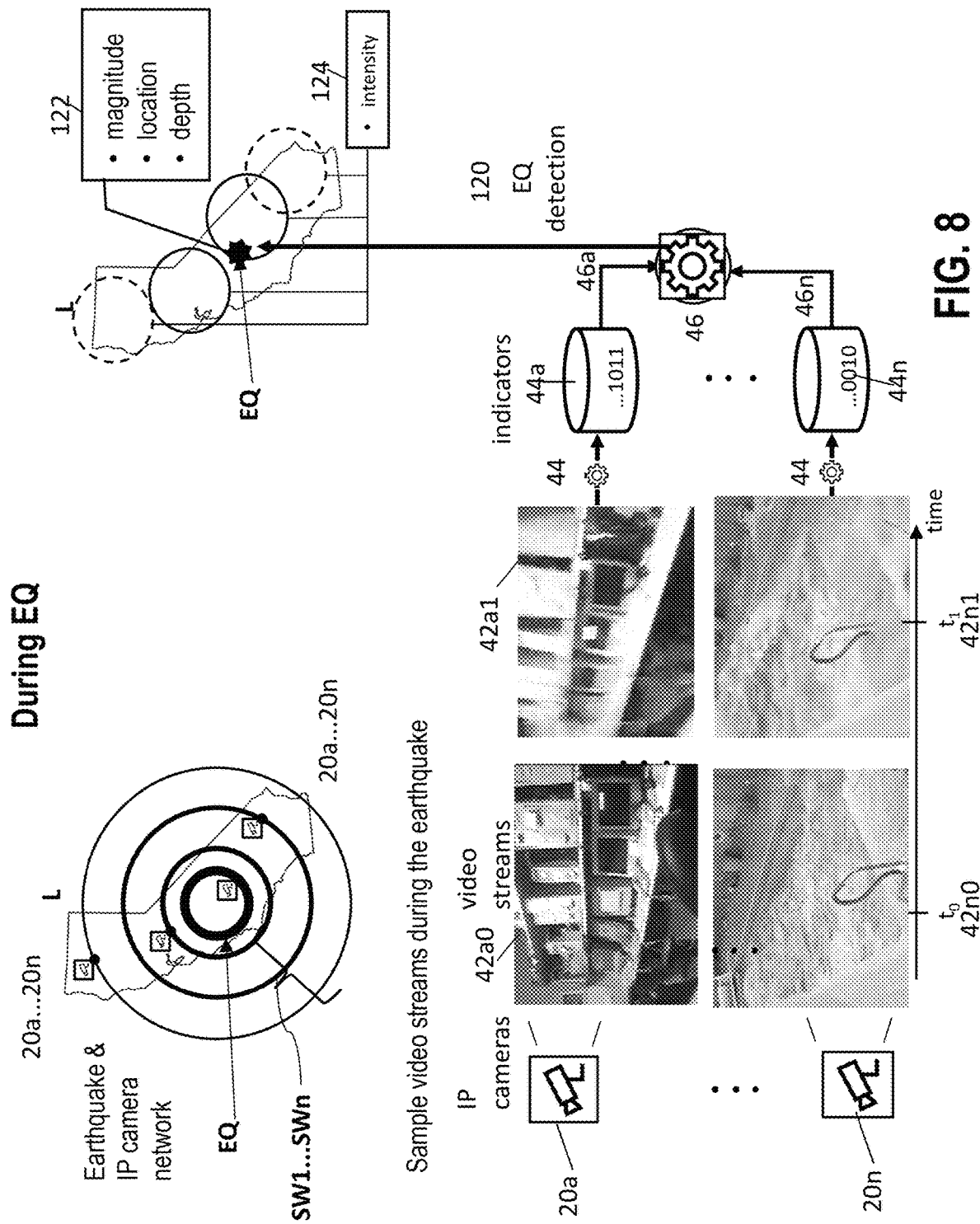
FIG. 8 is a conceptual block diagram of an assessment of an intensity of an earthquake during the earthquake, consistent with an illustrative embodiment.

Reference now is made to FIG. 7, which is a conceptual block diagram of an inference of a magnitude, location, and depth of an earthquake EQ via seismic inversion, consistent with an illustrative embodiment. In one embodiment, with respect to anomaly detection 46, the coupling correction 44 performed by earthquake analytics engine 110 may further include decoupling the spectral analysis over time of the pixel-wise changes by phase delay, frequency shift and amplitude into a first group representing a scene in the at least one image 40a . . . 40n and into a second group representing the at least one of the plurality of cameras 20a . . . 20n.

Decoupling the spectral analysis over time refers to transfer learning, namely, after having one set of IP cameras 20a . . . 20n with a learned AI and applying the learned AI to a new set of IP cameras (i.e. in a completely different area of the world). The model from the first area (with the first 'group' of cameras) could be used in the new area (which has a second 'group' of IP cameras). However, the model are re-trained (i.e., after EQ events have occurred).

Phase delay (in seconds) as defined herein is the time delay between the maximum pixel value (applied to each pixel location in a predefined video). Amplitude as defined herein is the maximum value of a pixel location across the entirety of the input video.

In one embodiment, with respect to anomaly detection 46, the earthquake analytics engine 110 may further include extracting and aggregating local approximations of phase delay, frequency shift, and amplitude to infer at least magnitude 122 and intensity 124 of the earthquake EQ. As further regarding anomaly detection 46, the earthquake analytics engine 110 may further include inferring location and depth 122 of the earthquake EQ. The anomaly detection 46, exactly as the decoupling correction 44, is learned implicitly by the model. In the same manner as distributed visual input X and X~ is used to learn the earthquake characteristics Y in case of an earthquake event, the model will infer the non-presence of an earthquake through an estimate of Y (magnitude 0, depth 0, arbitrary latitude, longitude) by visual input X and X~ at all times. Therefore, anomaly detection 46 merely refers to the presence of unusual values of the respective features. In contrast to seismic sensors, there is no physical derivation of features involved (velocity vectors, etc.,) as the visual inputs from the IP cameras 20a . . . 20n, in conjunction with their locations, are end-to-end learned to infer the presence/non-presence of an earthquake.

Figure 9:
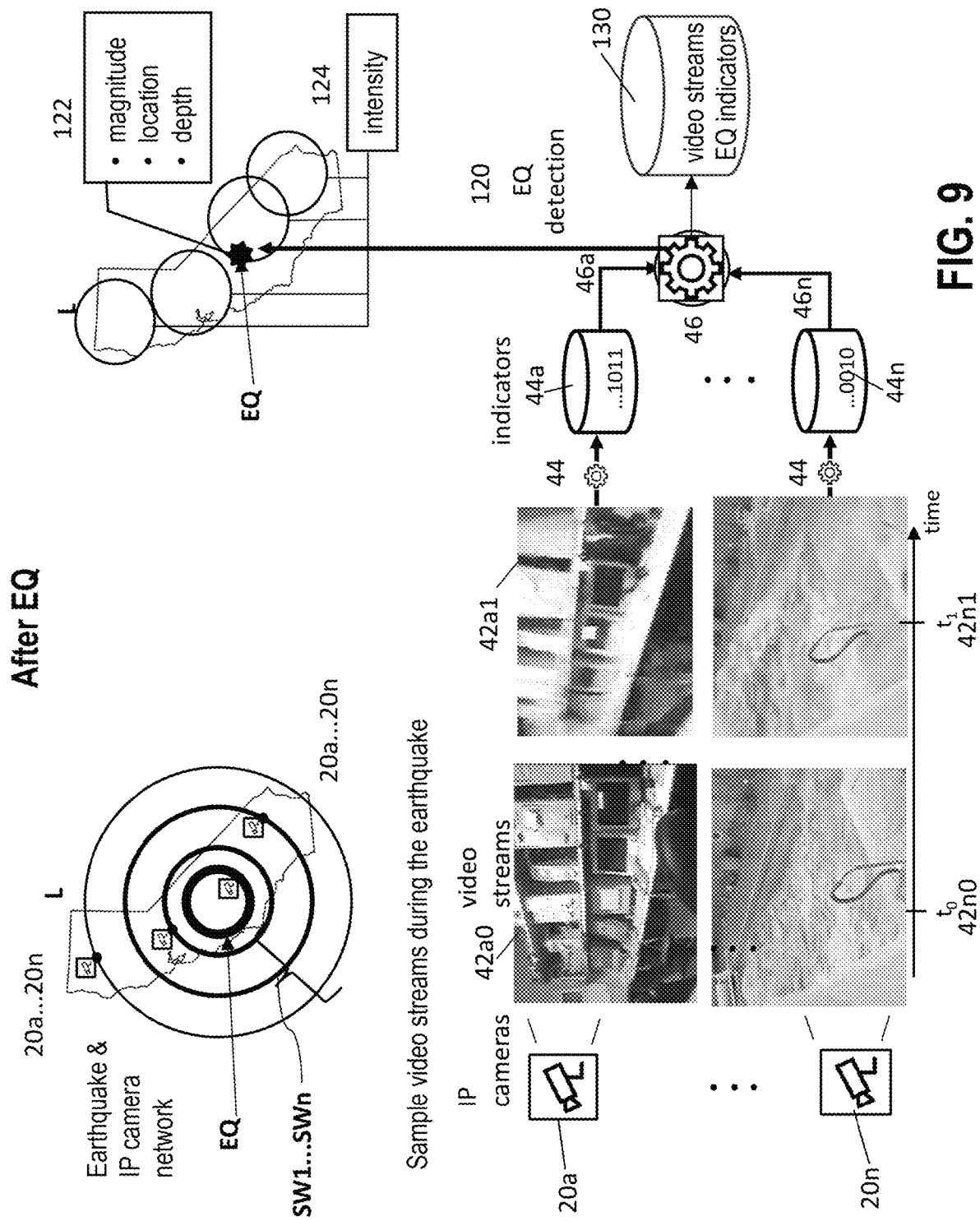
FIG. 9 is a conceptual block diagram of providing an assessment of an intensity of an earthquake during the earthquake, consistent with an illustrative embodiment.

FIG. 9 is a conceptual block diagram of an assessment of an intensity of an earthquake (EQ) after an earthquake, consistent with an illustrative embodiment. For example, following an earthquake EQ, the earthquake analytics engine 110 stores indicators 122 as key video streams 126 and earthquake indicator values 128 of at least one of magnitude, location, or depth of the earthquake EQ and assessment of earthquake intensity 124 (see FIGS. 2 and 3).

Figure 10:
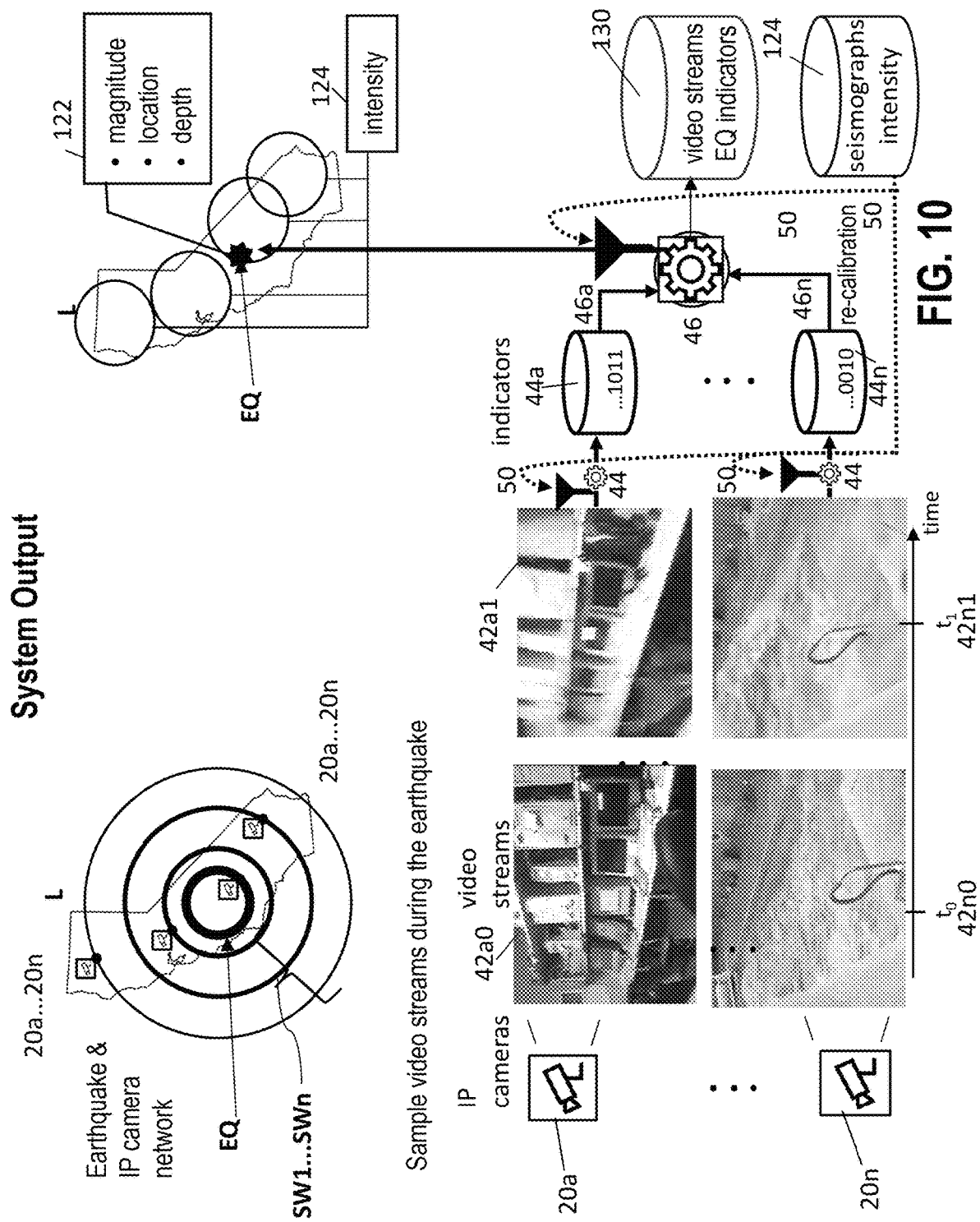
FIG. 10 is a conceptual block diagram of a refinement of a calibration of a plurality of cameras via external seismic sensor data and additional assessment of earthquake intensity, consistent with an illustrative embodiment.

FIG. 10 is a conceptual block diagram of a refinement of a calibration (see FIGS. 2 and 3 re-calibration processing 170 and re-calibrated analytics 50) of a plurality of cameras 20a . . . 20n via external seismic sensor data and additional assessment of earthquake intensity, consistent with an illustrative embodiment. For example, after an earthquake, the earthquake analytics engine 110 maintains the AI model architectures and visual inputs in a fixed state. However, the earthquake analytics engine 110 then causes the AI model parameters to be re-assessed through a re-training step, i.e., re-calibration processing 170. There, the previous, historical record of visual input and earthquakes event characteristics is now appended by the new pair of visual input and earthquake characteristics. This AI model-retraining step can be done periodically and triggered automatically at a fixed periodicity (e.g. daily, weekly, monthly). The historical record does not only include earthquake events but non-earthquake events (with magnitude value 0, intensity value 0, and arbitrary latitude/longitude) such that the earthquake detection system 120 is able to distinguish between earthquake and non-earthquake events for various types of distributed visual input.

Example Computer Platform

Figure 11:
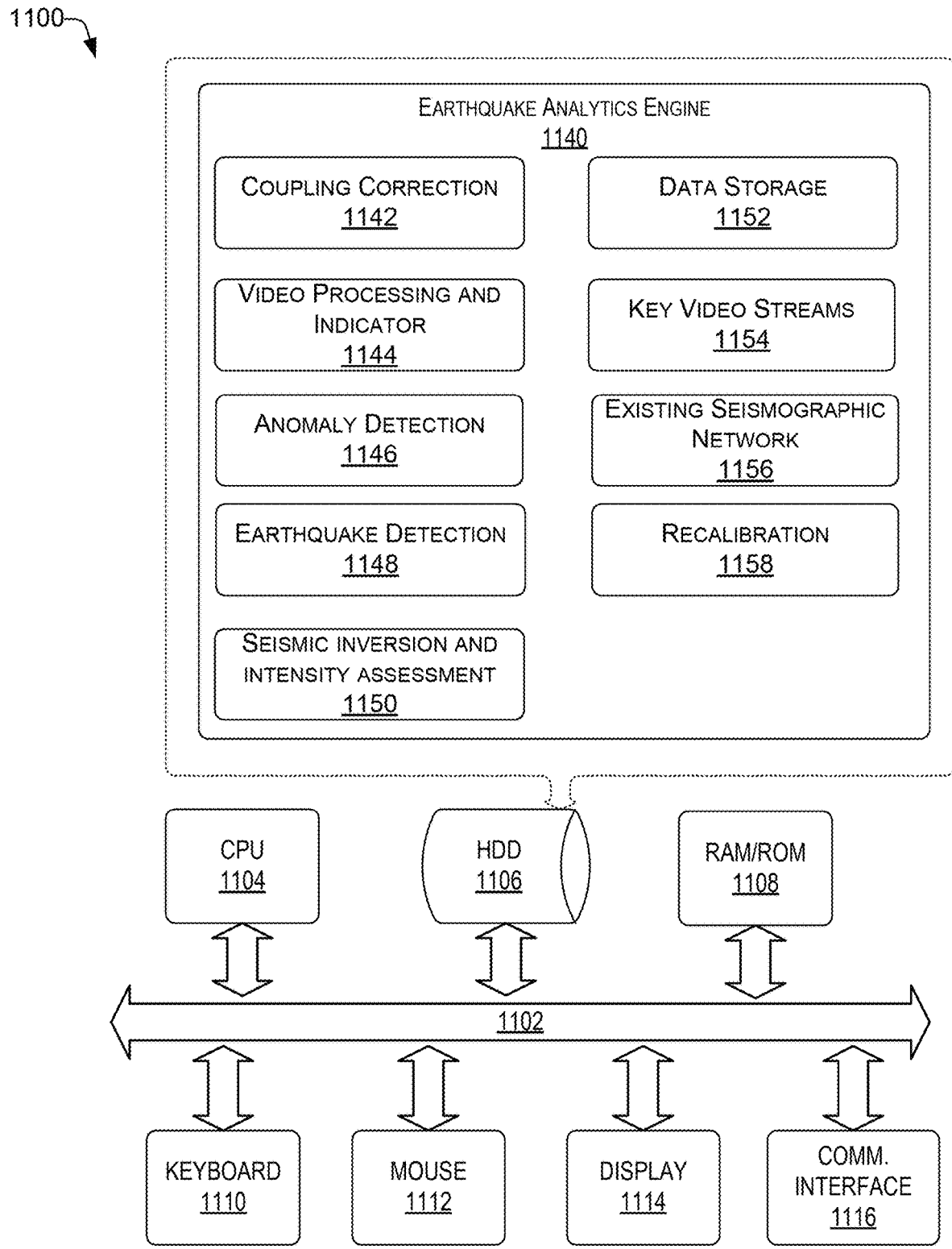
FIG. 11 is a functional block diagram illustration of a computer hardware platform that can be used to implement a particularly configured computing device that can host the earthquake detection engine.

As discussed above, functions relating to, during an earthquake, recognizing abnormal shaking across a plurality of Internet Protocol (IP) cameras that provide distributed visual input of a location, via interfacing with a cloud or dedicated network, as shown in FIGS. 1-10, can be performed with the use of one or more computing devices connected for data communication via wireless or wired communication. FIG. 11 is a functional block diagram illustration of a computer hardware platform that can communicate with various networked components, such as networked IP cameras, the cloud, etc. In particular, FIG. 11 illustrates a network or host computer platform 1100, as may be used to implement a server, such as the earthquake analytics engine 110 of FIG. 2.

The computer platform 1100 may include a central processing unit (CPU) 1104, a hard disk drive (HDD) 1106, random access memory (RAM) and/or read only memory (ROM) 1108, a keyboard 1110, a mouse 1112, a display 1114, and a communication interface 1116, which are connected to a system bus 1102.

In one embodiment, the HDD 1106, has capabilities that include storing a program that can execute various processes, such as the earthquake analytics engine 1140, in a manner described herein. The earthquake analytics engine 1140 may have various modules configured to perform different functions. For example, there may be a coupling correction module 1142 that is applied to subtract velocity vectors of a camera from the velocity vectors of pixels defining the visual input for the image displayed by the camera. The coupling correction can be performed via convolutional neural networking and spectral decomposition that are executed by the coupling correction module 1142.

There may be a video processing and indicator module 1144 which processes the video streams which have been subjected to the coupling correction and converts the coupling corrected video streams into indicators of movement that has occurred at the location and time of each individual image in the video streams.

There may be an anomaly detection module 1146 that analyzes the processed video streams and indicators to determine the occurrence of abnormal movement of the structure or structures that have been imaged by the cameras. Such abnormal movement is then identified as an anomaly by the module 1146.

There may be an earthquake detection module 1148 that processes the one or more anomalies received from the anomaly detection module and performs seismic inversion and intensity assessment.

There may be a seismic inversion and intensity assessment module 1150 which calculates magnitude, location and depth of the earthquake and performs an intensity assessment. This information is then transferred to an earthquake early warning system and for disaster response management.

There may be a data storage module 1152 which stores anomalies identified by, and received from, the anomaly detection module 1146.

There may be a key video streams and earthquake indicator values module 1154 which receives higher priority video streams and earthquake indicator values from the data storage module 1152 and then transfers the video streams and indicator values to the earthquake early warning system and for disaster response management.

There may be an existing seismographic network module 1156 which receives data from the seismic inversion and intensity assessment module 1150 and from the key video streams and earthquake indicator values module 1154 which may forward the data for re-calibration after the earthquake.

There may be a recalibration module 1158 which recalibrates the data from the seismic inversion and intensity assessment module 1150 and from the key video streams and earthquake indicator values module 1154 and which then forwards the results to the anomaly detection module 1146 and to the earthquake detection module 1148 to improve accuracy for pending aftershocks and future earthquakes.

Example Cloud Platform

As discussed above, functions relating to an earthquake detection and response via distributed visual input, may include a cloud 102 or network 104 (see FIG. 2). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
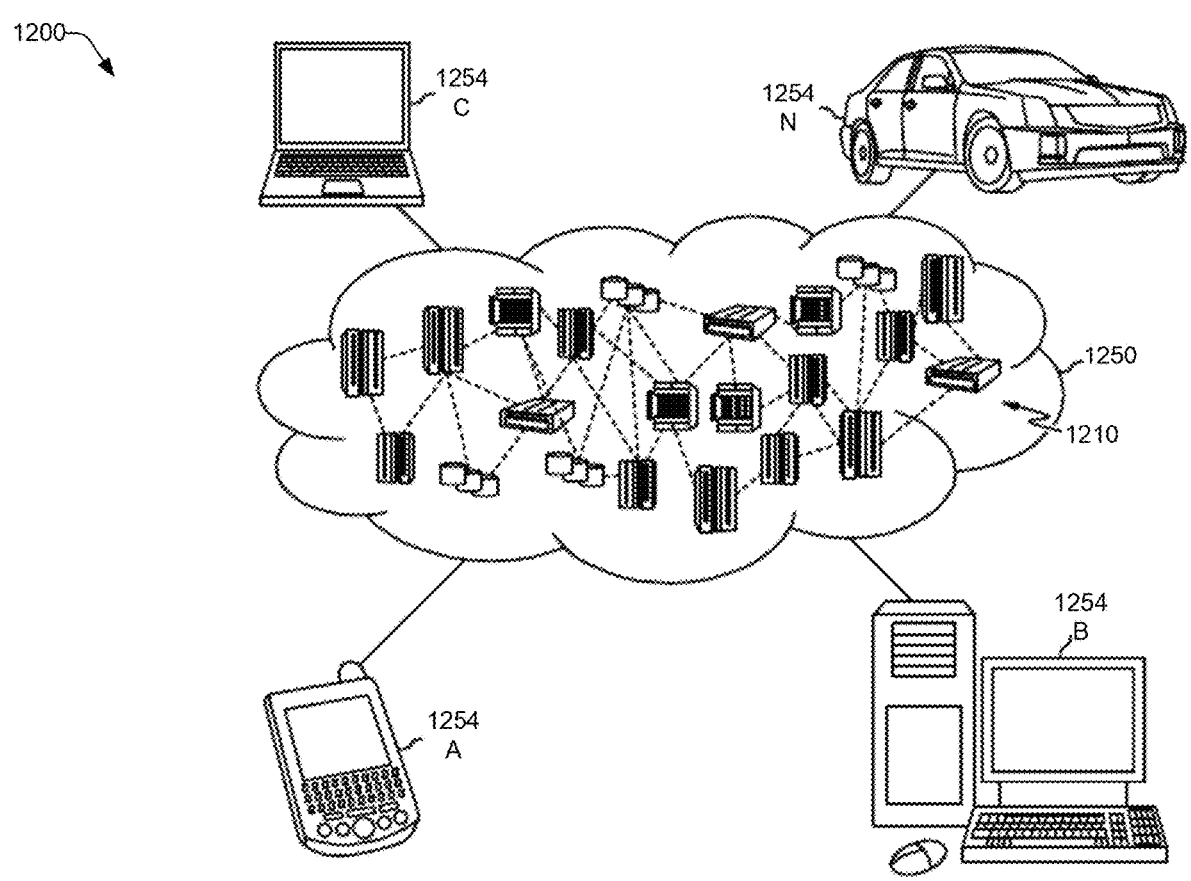
FIG. 12 depicts a cloud computing environment, consistent with an illustrative embodiment.

Referring now to FIG. 12, an illustrative cloud computing environment 1200 is depicted. As shown, cloud computing environment 1200 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
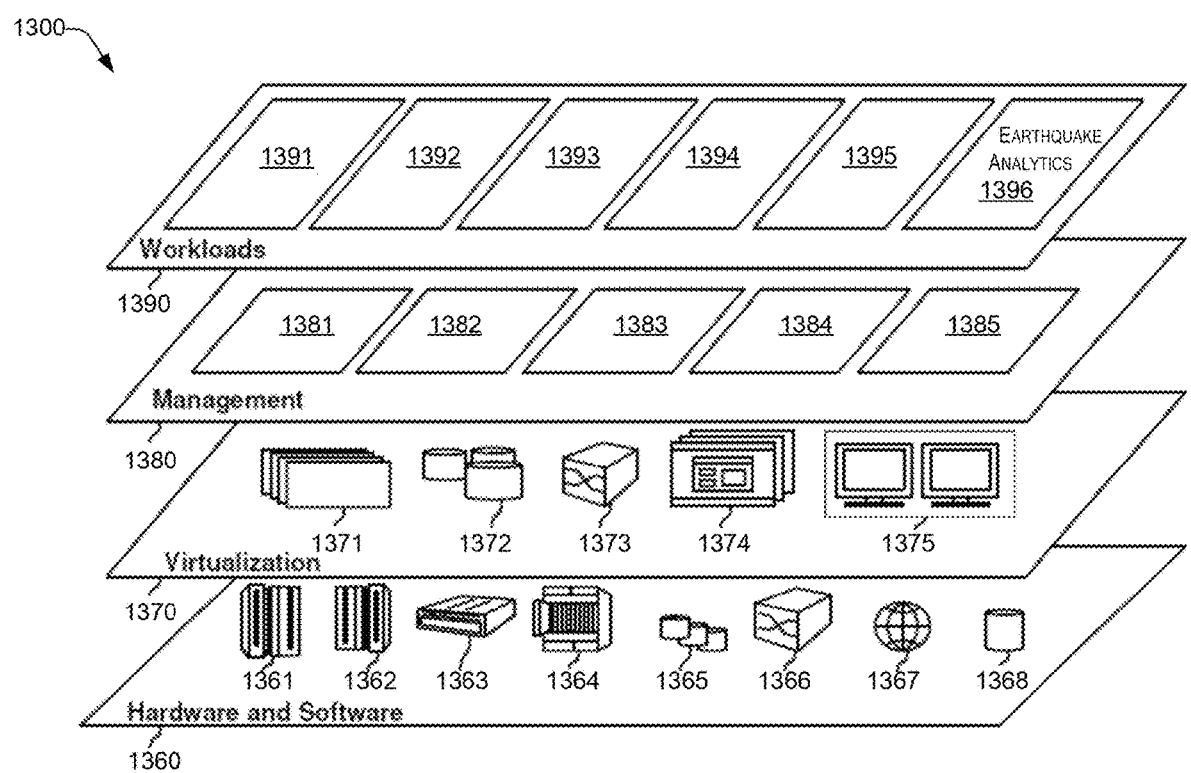
FIG. 13 depicts abstraction model layers, consistent with an illustrative embodiment.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the disclosure are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and earthquake analytics engine 1396, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a storage device coupled to the processor;
   an earthquake engine, wherein an execution of the earthquake engine by the processor configures the computing device to perform acts comprising:
      receiving from each of a plurality of cameras, a visual input of a location over a network;
      for each visual input from the plurality of cameras:
         performing a coupling correction between a shaking of the camera with respect to the visual input by subtracting velocity vectors of the plurality of cameras from velocity vectors of pixels defining the visual input to provide a processed input; and
         determining whether a shaking identified in the processed input is above a predetermined threshold based on the processed input, thereby detecting one or more anomalies;

inferring from the one or more anomalies at least one of a location, magnitude, or depth of an earthquake based on the shaking identified in the processed input of each of the plurality of cameras, and sending a notification of the one or more anomalies to an earthquake early warning system and/or for disaster response management.

2. The computing device of claim 1, wherein an execution of the earthquake engine by the processor further configures the computing device to perform an act comprising determining an intensity of the earthquake based on the shaking identified in the processed input of each of the plurality of cameras.

3. The computing device of claim 2, wherein the inference of the at least one of the location, magnitude, or depth comprises extracting and aggregating local approximations of at least one of a phase delay between a predetermined maximum pixel value applied to each pixel location in the visual input and an amplitude of a maximum value of a pixel location across an entirety of the visual input.

4. The computing device of claim 1, wherein the shaking is measured by one or more pixel-wise changes of the processed input.

5. The computing device of claim 4, wherein an execution of the earthquake engine by the processor further configures the computing device to perform acts comprising, for at least one visual input from the plurality of cameras:

performing a spectral analysis over time of each of the pixel-wise changes in at least one image of the visual input; and determining a spectral decomposition of the at least one image of the visual input.

6. The computing device of claim 5, wherein an execution of the earthquake engine by the processor further configures the computing device to perform acts comprising:

training an artificial intelligence (AI) model to detect parameters of an earthquake based on the visual input from the plurality of cameras; and applying the trained AI model to visual input from a different set of a plurality of cameras at a separate location.

7. The computing device of claim 1, wherein an execution of the earthquake engine by the processor further configures the computing device to perform an act comprising after a completion of an identified earthquake, storing indicators of at least one of the magnitude, location, or depth of the identified earthquake.

8. The computing device of claim 1, wherein an execution of the earthquake engine by the processor further configures the computing device to perform an act comprising refining a calibration of the plurality of cameras via external seismic sensor data.

9. A non-transitory computer readable storage medium tangibly embodying a computer readable program code having computer readable instructions that, when executed, causes a computing device to carry out a method of detecting an earthquake, comprising:

receiving, from each of a plurality of cameras, a visual input of a location over a network;

for each visual input from the plurality of cameras:

performing a coupling correction between a shaking of the camera with respect to the visual input by subtracting velocity vectors of the plurality of cameras from velocity vectors of pixels defining the visual input to provide a processed input; and determining whether a shaking identified in the processed input is above a predetermined threshold based on the processed input, thereby detecting one or more anomalies;

inferring from the one or more anomalies at least one of a location, magnitude, or depth of an earthquake based on the shaking identified in the processed input of each of the plurality of cameras, and sending a notification of the one or more anomalies to an earthquake early warning system and/or for disaster response management.

10. The non-transitory computer readable storage medium of claim 9, further comprising determining an intensity of the earthquake based on the shaking identified in the processed input of each of the plurality of cameras.

11. The non-transitory computer readable storage medium of claim 10, wherein the inference of the at least one of the location, magnitude, or depth comprises extracting and aggregating local approximations of at least one of a phase delay between a predetermined maximum pixel value applied to each pixel location in the visual input and an amplitude of a maximum value of a pixel location across an entirety of the visual input.

12. The non-transitory computer readable storage medium of claim 9, wherein the shaking is measured by one or more pixel-wise changes of the processed input and further comprising:

for at least one visual input from the plurality of cameras:

performing a spectral analysis over time of each of the pixel-wise changes in at least one image of the visual input; and determining a spectral decomposition of the at least one image of the visual input.

13. The non-transitory computer readable storage medium of claim 12, further comprising:

training an artificial intelligence (AI) model to detect parameters of an earthquake based on the visual input from the plurality of cameras; and applying the trained AI model to visual input from a different set of a plurality of cameras at a separate location.

14. The non-transitory computer readable storage medium of claim 9, further comprising after a completion of an identified earthquake, storing indicators of at least one of the magnitude, location, or depth of the identified earthquake.

15. The non-transitory computer readable storage medium of claim 9, further comprising refining a calibration of the plurality of cameras via external seismic sensor data.

16. A computer implemented method comprising:

receiving, from each of a plurality of cameras, a visual input of a location over a network;

for each visual input from the plurality of cameras:

performing a coupling correction between a shaking of the camera with respect to the visual input by subtracting velocity vectors of the plurality of cameras from velocity vectors of pixels defining the visual input to provide a processed input; and determining whether a shaking identified in the processed input is above a predetermined threshold based on the processed input, thereby detecting one or more anomalies;

inferring from the one or more anomalies at least one of a location, magnitude, or depth of an earthquake based on the shaking identified in the processed input of each of the plurality of cameras, and sending a notification of the one or more anomalies to an earthquake early warning system and/or for disaster response management.

17. The computer implemented method of claim 16, further comprising determining an intensity of the earthquake based on the shaking identified in the processed input of each of the plurality of cameras.

18. The computer implemented method of claim 17, wherein the inference of the at least one of the location, magnitude, or depth comprises extracting and aggregating local approximations of at least one of a phase delay between a predetermined maximum pixel value applied to each pixel location in the visual input and an amplitude of a maximum value of a pixel location across an entirety of the visual input.

19. The computer implemented method of claim 16, wherein the shaking is measured by one or more pixel-wise changes of the processed input and further comprising:
 for at least one visual input from the plurality of cameras:
  performing a spectral analysis over time of each of the pixel-wise changes in at least one image of the visual input; and
  determining a spectral decomposition of the at least one image of the visual input.

20. The non-transitory computer readable storage medium of claim 9, further comprising refining a calibration of the plurality of cameras via external seismic sensor data.

\* \* \* \* \*